March 8, 1949. S. MYERSON ET AL 2,463,551

METHOD OF MAKING ARTIFICIAL TEETH

Filed May 15, 1947

Inventors
Simon Myerson
Martin S. Myerson
by Roberts, Cushman & Groover
Att'ys.

Patented Mar. 8, 1949

2,463,551

UNITED STATES PATENT OFFICE 2,463,551

METHOD OF MAKING ARTIFICIAL TEETH

Simon Myerson and Martin S. Myerson,
Brookline, Mass.

Application May 15, 1947, Serial No. 748,304

3 Claims. (Cl. 117—119)

This invention relates to a novel method of making artificial teeth and portions thereof.

For several uses it has been found desirable to provide a portion or portions at least of an artificial tooth with retentive cells and to substantially fill such cells with a material having different characteristics from the material of the tooth portion in which the cells are formed. For example, the gingival or basal portion of a tooth may be provided with such cells for a considerable depth, they may be filled with a thermoplastic resin, such as polymerized methyl methacrylate and the tooth may then be secured to the oral support by causing a cohesive bond or molecular union of the tooth and the support during the usual process of packing and processing the denture. Another example is the provision of such cells at the occlusal region of a ceramic tooth and substantially filling them with a resin or other suitable material, thereby to provide a softer biting surface which more closely approximates in hardness the hardness of a natural tooth. Another example is the provision of such cells in the enamel simulating portion of an artificial tooth and filling them with a material having color or light reacting characteristics which differ from the corresponding characteristics of the material in which the cells are formed thereby providing a stippled appearance either throughout the labial face or in localized areas thereof. Such artificial teeth are more fully illustrated, described and claimed in copending application of Simon Myerson, Serial No. 39,258, filed July 17, 1948, entitled Artificial tooth and method of uniting an artificial tooth to a tooth support.

In said copending application and in copending application of Simon and Richard Myerson entitled Method of making artificial tooth, filed concurrently herewith, several methods are disclosed by which artificial teeth with such cells may be made.

In said copending application, several methods are disclosed by which the intercommunicating cells of a tooth may be filled with a synthetic resin or other material having different characteristics than the material of the tooth portion in which the cells are formed, some of such methods, i. e. the use of injection or compression moulding, are not entirely satisfactory because air becomes entrapped in the cells which are located remotely from the surface of the tooth and the cells accordingly are not substantially filled with the cell-filling material and the resultant tooth structure is not of uniform strength due to the presence of voids in the cells located in the internal structure of the tooth. The method of this invention obviates these defects and it is so efficient that cells may be filled throughout the entire ceramic structure of a tooth to an extent approximating 98% of the voids thereof. The resultant tooth is strong, durable and substantially free of unfilled cells.

The present invention has for one of its objects the provision of an economical method of treating an artificial tooth having cells in a portion at least thereof to substantially fill said cells with a material having different characteristics from the material in which the cells are formed.

Another object is the provision of an economic method of substantially filling the cells of a portion at least of a tooth with a polymerizable compound adapted to produce a resin and polymerizing or hardening the resin contained in the cells without leaving substantial voids therein.

Another object is to provide a method or methods which eliminate the defects of the aforesaid proposed method and which are capable of economical use in the manufacture of artificial teeth.

Other and further objects and advantages of the invention will be apparent from the following description and by reference to the accompanying drawing in which.

Figure 2:
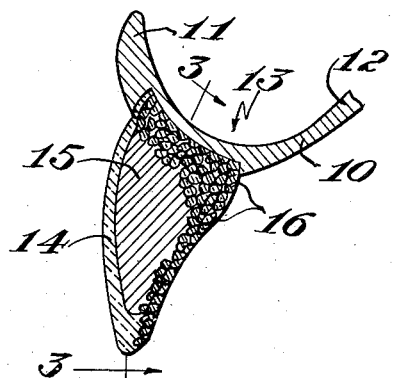
Fig. 2 is a labio-lingual vertical section of an anterior artificial tooth secured to an oral support, the tooth being provided with a ceramic portion having interconnected generally spherical cells which may be substantially filled with cell-filling material by the methods of this invention.
Figure 3:
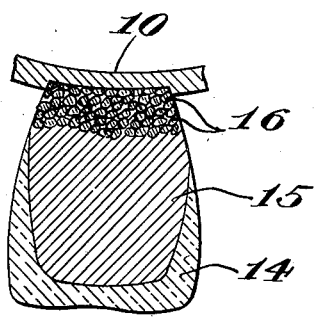
Fig. 3 is a section on the lines 3—3 of Fig. 2.

Referring to Figs. 2 and 3 of the drawings, the numeral 10 designates a portion of an oral support, in this case an upper plate, which is made of any suitable material, for example a synthetic resin such as polymerized methyl methacrylate. The forward portion 11, in use, is disposed at the labial surface of the gum ridge, and the rear portion 12 is designed to engage the surface of the palate, these two portions merging to form the channel 13 for the reception of the crest of the gum ridge.

Figure 1:
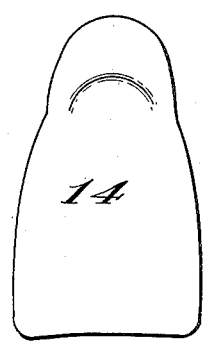
Fig. 1 is a front elevation of an artificial tooth.

The artificial tooth illustrated in Figs. 1 and 2 of the drawings may consist of three elements, the enamel-simulating portion 14 which may be made of a substantially transparent porcelain (see U. S. Patents 2,207,712, 2,202,713, 2,230,164 and Reissue 22,331); the dentine-simulating portion 15 which may be made of ceramic material; and the material 16 which substantially fills a multitude of intercommunicating cells generally spherical in shape, which have been provided in the gingival portion of the tooth and in the lingual portion of the tooth. The material 16 at the basal or gingival portion of the tooth is of a character such that it will firmly unite, preferably to form either a cohesive bond or a molecular union with the material of the plate or oral support in which the tooth is to be mounted. For example, it may be made of polymerized methyl methacrylate when the tooth is to be utilized in connection with a plate or other oral support of polymerized methyl methacrylate. In any case the material filling the cells at the basal portion of the tooth should be a synthetic resin (which term as used herein includes copolymers, interpolymers and mixtures of resins) which is such that a cohesive bond or molecular union may be formed between it and the material of oral supports commonly in use.

In use the gingival surface of the tooth may be ground to the extent necessary for proper mounting of the tooth, and the tooth may thereafter be joined to the material of the oral support during the usual process of packing and processing the denture which ordinarily produces sufficient heat and pressure to cause the material 16 at the basal portion of the tooth and the material of the oral support to coalesce or molecularly join. No loss of retention will be caused by such grinding unless the grinding goes below the portion of the tooth in which the cells have been formed and filled. The cells may be formed and filled to any required depth, or throughout the entire tooth, if desired.

The material 16 filling the cells at the biting or occlusal portions of the tooth should be a softer material than the ceramic materials in which the cells are formed in these locations, so that the resultant combination of the ceramic and the cell-filling materials at the occlusal portion of the tooth presents a softer surface than one which is composed solely of ceramic materials thereby reducing the wear on the occlussal surface of the natural tooth or teeth which bite against it. While the above mentioned synthetic resins are suitable for this purpose, other flowable materials which set and harden may also be used.

The same materials may be used to fill the cells provided at or near the labial face of the enamel-simulating portion of an artificial tooth to provide the stippled visual effect described above.

Figure 4:
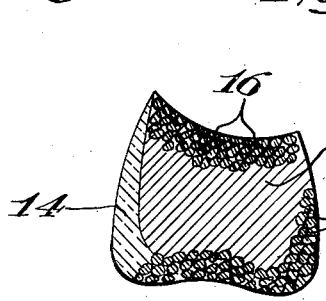
Fig. 4 is a labio-lingual vertical section of a posterior artificial tooth, the tooth being provided with portions having interconnected generally spherical cells which may be substantially filled with cell-filling material by the methods of this invention.

The tooth illustrated in Fig. 4 is a posterior tooth wherein the basal portion of the dentine-simulating part of the tooth has been provided with intercommunicating cells which are substantially filled with a material 16 capable of molecular union with or forming a cohesive bond with the oral support (as described above), and the occlusal portion of the tooth has been provided with intercommunicating cells which are filled with a material 16 which is softer than the material in which the cells are formed (as described above) so that the hardness of the occlusal surface may be controlled to approximate the hardness of the occlusal surface of the natural tooth.

Figure 5:
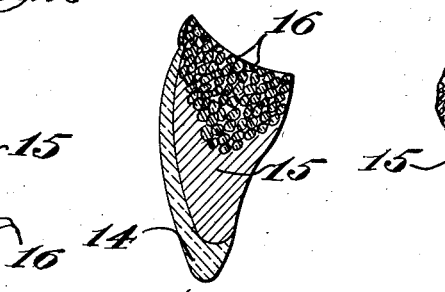
Fig. 5 is a labio-lingual vertical section of an anterior tooth having a ceramic portion provided with interconnected generally spherical cells which may be substantially filled with a cell-filling material by the methods of this invention.
Figure 6:
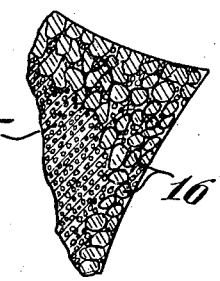
Fig. 6 is an enlarged section of a portion of the teeth of Figs. 2 to 5 inclusive illustrating the shape and distribution of the cells and the cell-filling material.

The tooth illustrated in Fig. 5 of the drawings is an anterior tooth having substantially spherical cells formed in the basal or gingival locality of the tooth. This tooth is similar in construction to that illustrated in Figs. 2 and 3 except that the cells no not extend downwardly along the lingual surface of the tooth to the incisal edge thereof and they extend deeper from the basal part into the central part of the dentine-simulating portion 15.

The method of this invention may be utilized to make artificial teeth such as are illustrated in Figs. 2 to 6 inclusive of the drawings as well as artificial teeth having cells located at other localities or portions thereof, for example, on the labial surface of the enamel-simulating portion, slightly below the labial surface of the enamel-simulating portion of the tooth or in any locality of the tooth to any extent desired.

Prior to performing the method of this invention it is necessary to prepare an artificial tooth which has at least a portion thereof made of ceramic material and contains a series of cells. Such an artificial tooth may be prepared by (i) forming a mix or mixes of ceramic materials and a binder, these mixes being used to form the non-cellular portion of the artificial tooth, (ii) forming a cell-forming mix of a ceramic material, a binder and a cell-forming material, this mix being used to form the cell-containing portion of the tooth, (iii) packing a tooth mould with these mixes so as to locate the cell-forming mix at the locality where the cells are desired, (iv) forming a biscuit tooth by heating the mould, (v) removing the cell-forming material from the biscuit tooth by application of a solvent which does not adversely affect the ceramic materials but which removes the cell-forming material and (vi) drying or vitrifying the resultant cell-containing ceramic tooth structure. The method of this invention may then be utilized to substantially fill the cells with a cell-filling material and to harden the cell-filling material within the cells.

The enamel-simulating portion 14 of the tooth may be formed of a slip consisting of feldspar and a binder such as starch, gum tragacanth, casein or the like. Other suitable ceramic materials and other suitable binders may be used as is well known in the art of making ceramic artificial teeth. The non-cellular portion of the dentine-simulating part of the tooth may be formed of a slip consisting of fifty parts by weight of feldspar, forty-five parts by weight of silica and five parts by weight of kaolin and a suitable binder such as any of the binders mentioned above. The cell-containing portion of the tooth when the cell-containing portion is to be located in the dentine-simulating portion 14 may consist of fifty parts by weight of the above-mentioned ceramic, dentine-simulating slip and fifty parts by weight of substantially spherical particles of a synthetic resin such as polymerized methyl methacrylate, polystyrene, polyvinyl acetate or polyvinyl chloride, preferably having a particle size of from .005 of an inch to .050 of an inch.

The enamel-simulating, dentine-simulating and cell-forming slips are then packed in a tooth mould so as to form the desired shape of the tooth, having the enamel-simulating, dentine-simulating and cell-containing portions appropriately located relative to each other (for three different arrangements see Figs. 2, 4 and 5). The mould is then heated, for example, for three minutes at a temperature of about 300° F. thereby to harden the ceramic portion of the tooth and produce a "biscuit" tooth. The biscuit tooth is then removed from the mould and placed in an appropriate solvent for the cell-forming material until the cell-forming particles have been substantially dissolved out of and removed from the ceramic structure. The tooth may then be dried by warm air or it may be immediately vitrified by firing in the manner customary in the manufacture of ceramic teeth.

Appropriate solvents for the cell-forming materials include methyl methacrylate monomer, or dioxene for polymethyl methacrylate, benzene for polystyrene and alcohol for polyvinyl acetate and polyvinyl chloride. The kind or shape of cell-forming material and the manner of removing the cell-forming material from the ceramic tooth structure is immaterial for the purposes of this invention.

The steps of the method of this invention are performed upon an artificial tooth which is at least in part ceramic and contains a series of cells in the ceramic portion thereof, this method being described in detail in the following portion of the specification.

Figure 7:
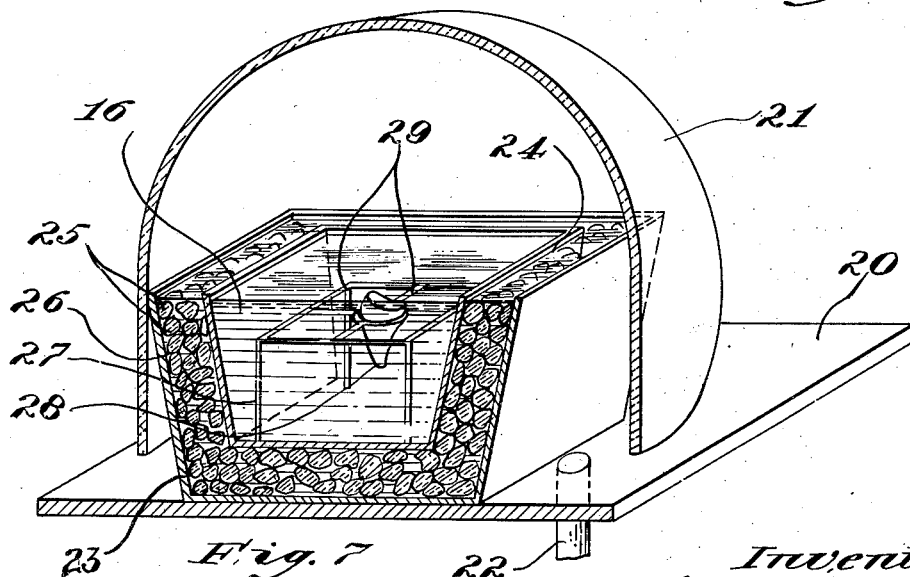
Fig. 7 is a perspective view of one form of apparatus useful in carrying out certain steps of the methods of this invention, parts being broken away and shown in section.

In Fig. 7 of the drawings an apparatus is illustrated which may be used in performing the preferred embodiment of certain of the subsequent steps of the method. This apparatus consists of a base plate 20, a removable vacuum bell 21, preferably made of glass or other transparent material, and a conduit 22 which affords communication through the base plate 20 between the interior of the vacuum bell 21 and a pump or other suitable device (not shown) for evacuating the interior of the vacuum bell. A container 23 rests upon the base plate 20 and is located within the confines of the vacuum bell 21. A mixture of ice 25 and alcohol 26 is placed in the container 23 and container 24 is set in the mixture. A rack 27 rests upon the bottom of the container 24 and this rack is provided with crossbars 29 which are joined to provide a support for an artificial tooth 28. The container 24 is substantially filled with a bath of the cell-filling material 16 which is to be incorporated in the cells of the tooth structure.

The cell-filling material 16 preferably selected from the group consisting of a compound adapted to produce a resin, a solution of a resin, or a solution of a partially polymerized resin-forming material capable of undergoing further polymerization. Examples of such compounds adapted to produce a resin are vinyl compounds such as methyl methacrylate monomer, styrene monomer, vinyl acetate monomer, vinyl chloride monomer; examples of solutions of a resin are solutions of polymerized vinyl compounds in monomers thereof; and examples of solutions of partially polymerized resin-forming materials capable of undergoing further polymerization are partially polymerized vinyl compounds in monomers of such vinyl compounds. It is understood that, if desired, co-polymerizable or inter-polymerizable compounds or mixtures thereof may be used so long as they are capable of producing a vinyl type resin of the characteristics desired in the portion of the tooth which is being filled, for example, copolymers of styrene and divinyl benzene or of methyl methacrylate and glycol dimethacrylate may be used where thermohardening materials are desired.

At the basal portion of the tooth thermoplastic resins are preferable because methyl methacrylate is the most popular material now used for oral supports. Preferably, for all uses, the bath 16 contains partially polymerized compounds so as to increase the viscosity of the bath, decrease evaporation and reduce shrinking during subsequent steps.

The tooth 28 which has been provided with a portion at least having intercommunicating cells is placed in the rack 27 and completely submerged in the bath 16 as shown in Fig. 7. The air in the vacuum bell 21 is then evacuated through the conduit 22 to produce a negative pressure (which in this specification and in the annexed claims means any pressure below atmospheric) therein, for example of the order of a fraction of an inch of mercury. This causes the air to be substantially evacuated from the cells of the tooth and the negative pressure is maintained until bubbles cease to rise from the tooth. The ice 25 and alcohol 26 cool the material of the bath 16 and prevent its boiling during this period of reduced pressure. After the air has been substantially evacuated from the cells the negative pressure is released and atmospheric pressure is admitted to the vacuum bell. This causes the flowable compound 16 to penetrate and substantially fill the cells of the tooth.

After the tooth has been allowed to remain submerged in the bath at atmospheric pressure for a sufficient period to accomplish the desired penetration, for example ten minutes, the holder 27 carrying the tooth may be removed and placed in a bath of a non-reactive fluid, such as Turkey red oil, glycerine, castor oil or oil of paraffin, and the compound 16 which is located in the cells is then hardened to the desired extent, for example it is polymerized by heating this bath. The tooth is then removed and any excess of resin on the exterior surface of the tooth is removed.

To insure more complete filling of the cells, the vacuum dipping may be repeated; also positive pressure (i. e. above atmospheric) may be introduced into the vacuum chamber.

The function of the oil bath is to prevent surface evaporation of the cell-filling material during polymerization. Any other appropriate liquid may be substituted for the aforesaid liquids so long as it is non-reactive with the cell-filling material and non-volatile at the hardening or polymerization temperature of the cell-filling material.

By the use of this invention the cells in the completed tooth may be filled to the extent of 98% or more with a hardened or polymerized cell-filling material 16.

From the foregoing it will be apparent that this invention provides an economical method of making an artificial tooth having interconnected cells throughout or in a portion thereof and for substantially filling such cells with a material having different characteristics from the material of the tooth portion in which the cells are formed, and that such method eliminates the defects of the other methods referred to earlier in the specification.

While certain materials have herein been specifically referred to, it is obvious that for certain purposes at least of this invention, e. g. visual effect and occlusal hardness effect, the cell-filling material need not be capable of forming a cohesive bond or a molecular union with the material of the oral support and therefore may be chosen from a great variety of materials not herein mentioned. Though various tooth portions which may be filled have been illustrated, the entire ceramic structure may be made cellular and substantially filled.

While certain desirable method steps have been illustrated by way of example, it is to be understood that the invention is not limited to such method steps but is to be regarded as broadly inclusive of any and all equivalent steps and methods falling within the scope of the appended claims.

We claim:

1. The method of treating a portion of an artificial tooth for use in the mouth of a human being, said tooth being at least in part ceramic and containing a series of cells in the ceramic portion thereof, comprising immersing at least the portion thereof which contains the cells in a liquid polymerizable cell-filling material selected from the group consisting of methyl methacrylate, styrene, vinyl acetate and vinyl chloride, substantially evacuating the cells by subjecting at least the portion of the tooth which contains the cells to negative pressure in a vacuum chamber, maintaining the liquid cell-filling material at a low temperature to prevent the loss of the cell-filling material during the negative pressure, releasing the negative pressure thereby causing the cell-filling material to substantially fill the cells, removing the tooth from said liquid cell-filling material and hardening the cell-filling material contained in the cells by polymerizing it.

2. The method of claim 1 wherein the hardening step comprises the steps of immersing at least the portion of the tooth which contains the cells and cell-filling material in an organic liquid which is non-reactive with the cell-filling material, said liquid being non-volatile at the polymerization temperature of the cell-filling material, and polymerizing the cell-filling material by heating the organic liquid to a temperature which is less than the volatilization temperature of the organic liquid but sufficient to polymerize the cell-filling material.

3. The method of claim 1 wherein the liquid cell-filling material consists of methyl methacrylate monomer.

SIMON MYERSON.
MARTIN S. MYERSON.

REFERENCES CITED

The following references are of record in the file of this patent:

UNITED STATES PATENTS

| Number | Name | Date |
|---|---|---|
| 1,729,057 | Texier | Sept. 24, 1929 |
| 1,950,430 | Calcott et al. | Mar. 13, 1934 |

OTHER REFERENCES

Ser. No. 368,390, Czapp (A. P. C.) pub. July 13, 1943.